May 14, 1940.    C. HARDY    2,200,743
METHOD OF MAKING A COMPOSITION OF PHOSPHORUS AND METAL
Filed Nov. 26, 1938    3 Sheets-Sheet 1

INVENTOR
Charles Hardy
BY
ATTORNEYS

Patented May 14, 1940

2,200,743

UNITED STATES PATENT OFFICE 2,200,743

METHOD OF MAKING A COMPOSITION OF PHOSPHORUS AND METAL

Charles Hardy, Pelham Manor, N. Y., assignor to Hardy Metallurgical Company, New York, N. Y., a corporation of Delaware Application November 26, 1938, Serial No. 242,601

18 Claims. (Cl. 75—135)

This invention is concerned with the treatment of elemental phosphorus and its incorporation in metallic bodies. More particularly, the invention is concerned with incorporating phosphorus into bodies of metals with which phosphorus tends to react or combine exothermically, and aims to accomplish the incorporation in such a way that the elemental phosphorus becomes substantially stable at ordinary temperatures, but is free at least in part to react or combine exothermically with the metal when the body containing both is raised to a more elevated temperature. The exothermic heat of reaction thus may be conserved and usefully employed in alloy manufacture, welding and other metallurgical processes in which phosphorus is combined with metals.

Phosphorus occurs in three allotropic forms, red, yellow and black. The yellow and black forms oxidize so readily that they ignite spontaneously in air. The red form oxidizes in air at ordinary temperature but not so rapidly as to cause spontaneous combustion. Phosphorus is a valuable alloy ingredient with some metals, for example, in phosphor-bronze. It also aids in imparting fluidity in welding and similar processes where ready flow of metals is desirable or requisite, and because of its affinity for oxygen is useful as a deoxidizer in many metallurgical processes. However, elemental phosphorus, even in the relatively stable red form, is difficult to employ in pyro-metallurgical processes because of the ease with which it oxidizes. Moreover, the ease with which phosphorus is oxidized makes it difficult and sometimes dangerous to store. Consequently, it has been proposed heretofore to utilize phosphorus in metallurgical processes while combined with metals in the form of phosphor metals or metallic phosphides. Such forms of phosphorus generally are stable, but their formation in the case of many metals is accompanied by a release of considerable heat which is not usefully employed.

Heretofore customary practice employing phosphor-metals as welding agents has involved supplying heat to the metals in amount sufficient to raise them above their melting points so that they fuse and bring about bonding of metallic surfaces between which they are interposed. For example, a eutectic alloy of phosphorus and copper containing about 7.3% of phosphorus and having a melting point of about 710° C. has been employed heretofore as a welding agent and brings about adequate bonding between various non-ferrous surfaces, provided that the welding operation is conducted at a temperature high enough to bring about fusion of the eutectic and at least incipient fusion of the surfaces to be welded together. Thus, in a present day continuous brazing operation lengths of copper tubes or bars having a melting point of about 1080° C. are welded end to end as they pass through a heating zone with eutectic phosphor copper (melting point 710° C.) in contact with the joint to be welded. The heating zone is maintained at 850 to 900° C. to assure that the melting point of the eutectic is exceeded. In the practice of my invention equivalent results are obtained while maintaining the heating zone at substantially lower temperatures.

As a result of my investigations, I have discovered that at temperatures below those at which elemental phosphorus alloys or combines with a metal, it tends to penetrate or diffuse into fine particles of the metal so that, in effect, a layer containing free phosphorus is formed thereon. This layer or coating is stable under ordinary conditions and the phosphorus contained therein is protected from oxidation. The stability thus achieved appears to be due to the fact that the large surfaces presented by the metal powder particles adsorb phosphorus. If the metal which adsorbs the phosphorus is one with which phosphorus tends to be combined exothermically, such exothermic combination may be brought about subsequently by heating the treated metal particles to the point at which the exothermic heat of combination of the metal with phosphorus (i. e., either a positive heat of reaction or solution) is released and therefore usefully employed. As described and claimed in my co-pending application Serial No. 241,609, filed November 21, 1938, my invention therefore contemplates a novel metallurgical addition agent for use in alloy manufacture, welding or the like (and especially as a welding composition) comprising finely-divided particles of a metal with which phosphorus tends to combine exothermically, said particles also containing phosphorus which is in the free state (i. e., not combined as a phosphide or alloyed with the metal) but sufficiently stable by virtue of its intimate association with the metal that it is substantially non-oxidizable under atmospheric conditions.

In accordance with my invention, the metallurgical addition product is made by treating powder of a suitable metal, in a substantially uncompacted condition, with elemental phosphorus, the treatment being carried on above the melting point of yellow phosphorus but substantially below the temperature at which exothermic combination of the metal and the phosphorus is completed, and preferably below a temperature at which such combination begins. Any metal which will combine exothermically with elemental phosphorus at temperatures above the melting point of the latter may be employed in the practice of my invention, among such metals being platinum, zinc, nickel and cobalt, which tend to combine with phosphorus with generation of heat and light, and sometimes, as I have discovered in the case of nickel, with almost explosive violence. Silver, gold, copper, lead, cadmium and tungsten, whose combination with phosphorus is attended by the liberation of heat only, may also be employed. The combination may be either by way of solution or reaction. In other words, the exothermic heat of combination may be either a positive heat of solution or of reaction, or both. From a commercial standpoint, compositions of my invention in which one or more of the metals, copper, cobalt and nickel, are included with free stable phosphorus are probably most important and hereinafter my invention is described in detail with reference to these elements. It will be understood, however, that my invention contemplates broadly the manufacture of a metallurgical addition agent by exposing to the action of elemental phosphorus the powders of a metal with which phosphorus tends to combine exothermically (either by alloying or reacting therewith) the treatment of the metal powder with the phosphorus being conducted under such conditions that combination of the metal with the phosphorus is inhibited to the end that the phosphorus acquires stability at ordinary temperatures, but is free to combine with the metal at more elevated temperatures with a release of exothermic heat. As explained more fully hereinafter, and claimed in my copending application Serial No. 241,609, filed November 21, 1938, my invention also contemplates the improvement in a process (for example, welding or alloy manufacture) involving the incorporation of phosphorus into a body of metal, which comprises adding phosphorus to said body in the form of finely-divided metal powder, the individual particles of which contain free phosphorus and a metal capable of reacting exothermically with the phosphorus, and heating said mixture in contact with said body until the metal and the phosphorus combine exothermically. These and other features of my invention will be understood more thoroughly in the light of the following description of the presently preferred manufacture, nature and utilization of the novel metallurgical addition agents of my invention taken in conjunction with the accompanying drawings, in which:

Figure 1:
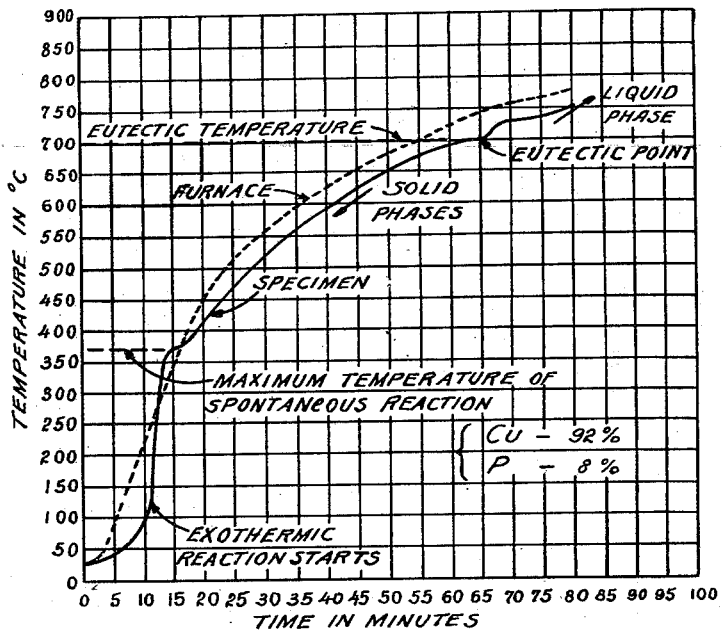
Fig. 1 is a graph of results obtained in heating a powdered mixture of phosphorus and copper through the range at which exothermic combination takes place.
Figure 2:
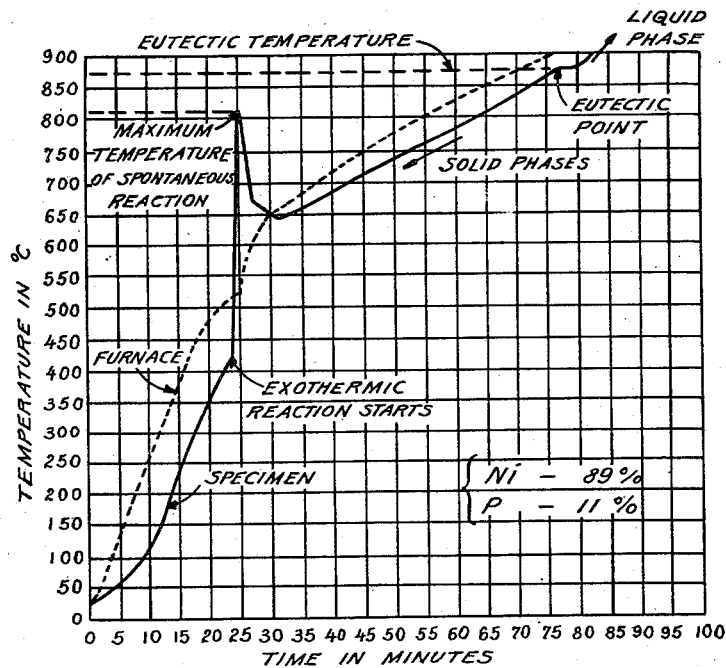
Fig. 2 is similar to Fig. 1 except that the metal combining with phosphorus is nickel.
Figure 3:
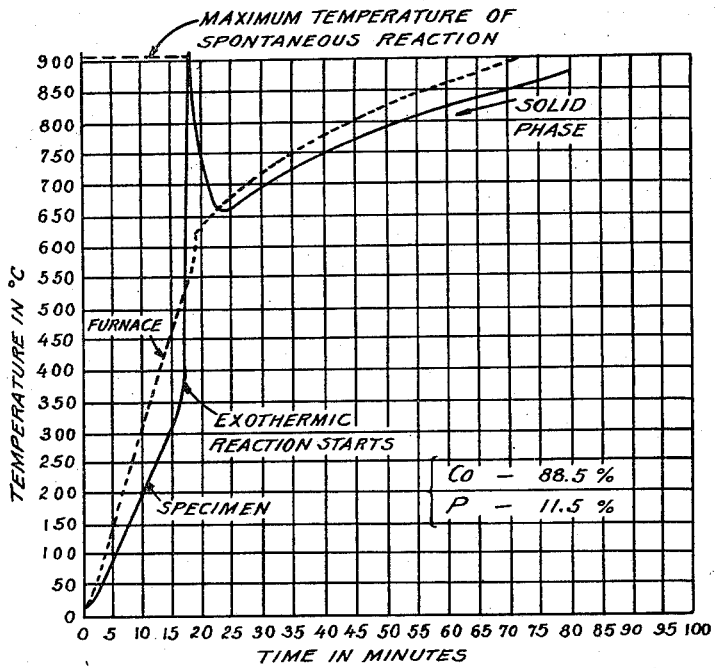
Fig. 3 is similar to Fig. 1, except that the metal employed is cobalt.
Figure 4:
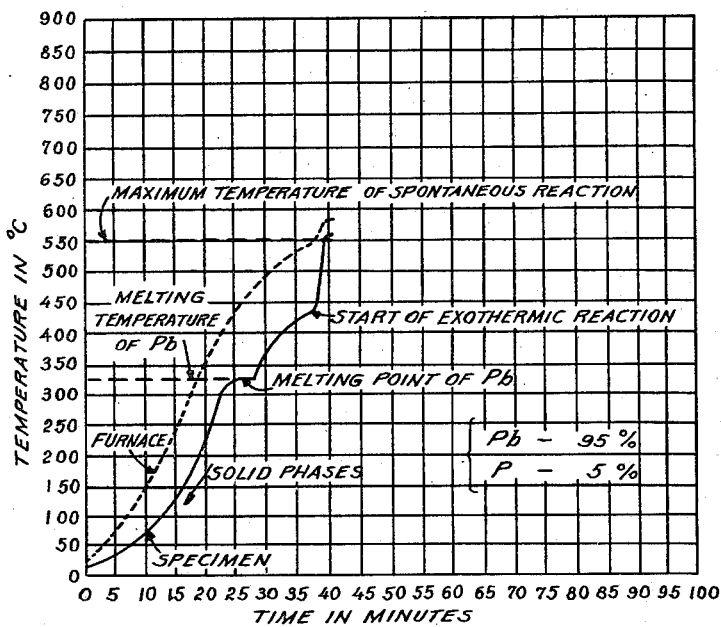
Fig. 4 is similar to Fig. 1, except that the metal employed is lead.
Figure 5:
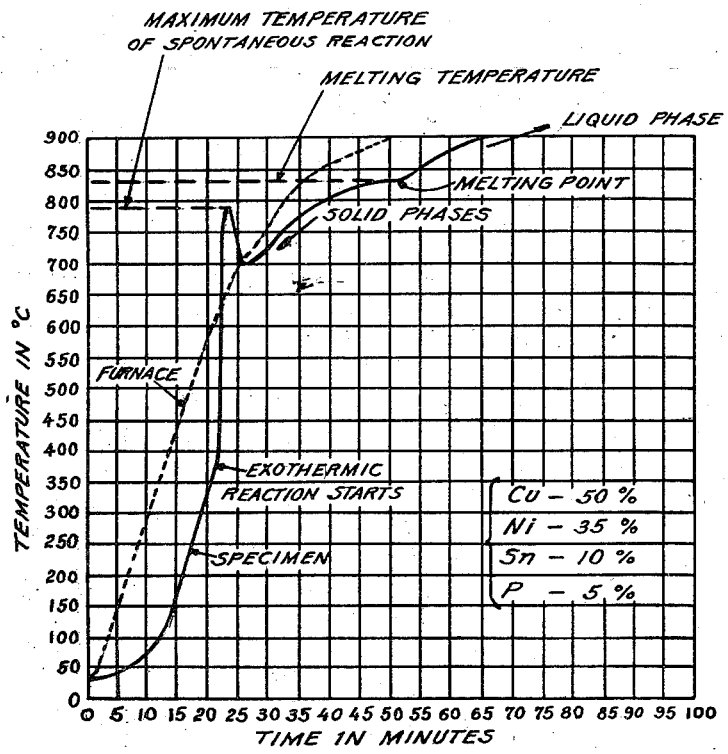
Fig. 5 illustrates the phenomena involved when phosphorus is heated with a mixture of copper, nickel and tin.

At atmospheric pressures, finely-divided copper does not tend to combine exothermically with elemental phosphorus at temperatures below about 135° C., but between this temperature and the melting point of yellow phosphorus (44° C.) phosphorus does penetrate the copper particles and becomes stabilized. Exothermic combination of the phosphorus and the copper is not complete until temperatures substantially in excess of 370° C. are attained. My invention, therefore, contemplates the treatment of finely-divided copper with elemental phosphorus at temperatures ranging from about 44° C. to about 370° C., and preferably in the range, 44° C. to 135° C. Yellow phosphorus boils at 280° C. so that the treatment may be accomplished either with molten or vaporized phosphorus. However, from the standpoint of heat conservation, treatment with phosphorus at a temperature of about 130° C., is preferred.

The treatment procedure to be employed will depend upon the form in which the elemental phosphorus is available and the particular metal or metal mixture with which it is to combine. Red phosphorus is inherently more stable than the other varieties and moreover is available in powder form. Hence, with red phosphorus as a starting material, I prefer to mix the powdered metal, for example, copper with the powdered red phosphorus at room temperature. The yellow variety of phosphorus may also be mixed with the metal powder at room temperature. But, since yellow phosphorus is a pasty mass at room temperatures, and so, quite aside from its tendency to ignite spontaneously, is not easy to mix with metal powder, I prefer to employ this variety of phosphorus by vaporizing it, provided that the temperature at which the metal combines with the phosphorus with substantial completeness is above the boiling point of the phosphorus. I have found, however, that the stability of all forms of phosphorus is improved merely by mixing them with a substantially large proportion of metal powder of high heat conductivity and without the application of heat. Phosphorus in such a mixture does not ignite spontaneously in air, and its rate of oxidation is substantially reduced. I attribute the prevention of spontaneous combustion to the fact that the metal powder particles protect the surface of a large proportion of the phosphorus from the action of air and thus reduce the amount of heat generated by oxidation, and also to the fact that such heat of oxidation as is generated is conducted out of the mass with such facility that the phosphorus does not rise to ignition temperature. Whatever be the explanation, I have discovered that mere mechanical mixtures of elemental phosphorus and a large proportion of metal powder may be stored for long periods in air with but slight danger of substantial oxidation and substantially none of spontaneous ignition and my invention contemplates the protection of phosphorus from oxidation by such means.

Assuming that the phosphorus to be employed is of the red variety and is in powdered form, the procedure which I prefer to employ is as follows:

Powdered red phosphorus and metal powder, for example, copper, in the proportions which are desired in the product, are mixed together at room temperature, no special precautions being necessary to avoid ignition. On a small scale, mixing may be accomplished by introducing the requisite amounts of the ingredients, say 10 parts by weight of powdered red phosphorus, and 90 parts by weight of copper powder into a glass bottle which is then corked and rolled or shaken for a few minutes until the mixture appears homogenous when viewed with the naked eye. Mixing upon a larger scale may be accomplished in a closed rotating mixing drum lined with wood or lead or similar material which does not tend to cause sparks. The resulting mixture usually is subjected to heat treatment soon after preparation, but if necessary, may be kept for a considerable period without taking any special precautions against oxidation.

Generally speaking, the finer the metal powder, the more intimate the mixture with the phosphorus and the more rapid the rate at which phosphorus penetrates the metal powder particles upon heating. However, it is unnecessary to employ metal powder of extreme fineness, and good results may be obtained with powder of 100 to 200 mesh Tyler scale.

Heating of the powder mixture should take place under non-oxidizing conditions. These may be obtained by filling the container in which the heating is to occur substantially completely with the mixture, by evacuation of the container, or by filling the voids therein with a non-oxidizing gas, such as nitrogen or hydrogen.

The powder mixture should be heat treated while in a substantially uncompacted condition. The use of pressure tends to cause combination of the phosphorus with the metal. The uncompacted mixture of phosphorus powder and metal powder should be heated, preferably in a closed crucible, to assure melting of the phosphorus.

The penetration of phosphorus into the metal powder appears to be most rapid at temperatures slightly below the boiling point of yellow phosphorus, say 271° C., and with certain metals such as nickel and cobalt which do not combine exothermically substantially with phosphorus except at higher temperatures, such a temperature is preferred. However, with copper, the temperature should be substantially lower, say 130° C. After a short heating interval, say 30 minutes, the heat treated mass is allowed to cool in a non-oxidizing atmosphere and will in general be found slightly consolidated. The particles may be broken apart by a mild crushing action. Ordinarily, the degree of consolidation is so slight that a relatively vigorous screening operation will serve to break up the aggregates, although to assure the absence of any aggregates, it may be desirable to subject the heat treated mass to ball milling or the like.

To take a specific example of the practice of my invention for the manufacture of a welding composition containing optimum proportions of phosphorus, 7.3 parts by weight of powdered red phosphorus are mixed with 92.7 parts by weight of copper powder having a particle size of 100 mesh or less, and in which the copper particles are substantially unoxidized. Mixing is accomplished by rolling in a sealed glass-lined drum for about 20 minutes. The mixture is then placed in a sealed muffle in a reducing or non-oxidizing atmosphere of flue gas or hydrogen, and heated to a temperature of about 130° C., and maintained at this temperature from 30 to 60 minutes. The mass is then allowed to cool in a non-oxidizing atmosphere and after cooling, subjected to slight comminution (for example, by rolling between the hands) in order to restore all of it to powder form. After such treatment, the mass consists of finely-divided copper particles having a decreasing phosphorus content which tends to be of highest concentration at the surface of the particles and to decrease with depth. The particle size of the product is substantially that of the original copper powder, and the phosphorus content is about 7.3%. Because the operation is carried on in a closed vessel, losses of phosphorus are negligible.

As indicated hereinbefore, the foregoing procedure, with modifications, may be employed when the phosphorus is of the yellow or black variety. But with these less stable varieties of phosphorus, which are also more difficult to mix because of their pasty condition, mixing should be conducted in an evacuated or non-oxidizing atmosphere. For instance, pasty yellow phosphorus may be pugged with dry nickel powder in a pug mill from which air is excluded and in which the moving parts are of a non-sparking material such as wood. In general, however, it is more convenient both from the standpoint of safety and ease of operation to vaporize the yellow or black phosphorus and bring it into contact with the metal powder (say, nickel) in such condition. Preferably, the phosphorus is vaporized and passed in contact with the metal powder particles heated to the point where phosphorus will condense upon the powder particles as a liquid but not as a solid. Intimate contact between the metal powder and the phosphorus may be assured by permitting the metal powder particles to pass in a dispersed condition through a body of the phosphorus vapor (so that in effect, the phosphorus vapor is passed through a mass of the metal powder) or by agitating the powders in contact with phosphorus vapor. Good contact may also be obtained by forcing the phosphorus vapor through a relatively thin bed of the loose metal powders. In most cases, adequate contact may be assured merely by passing the phosphorus vapor over a relatively thin bed of the metal powders.

The heat contained in the metal powders and the phosphorus vapors brought into contact with each other should be sufficient to prevent the condensation of the phosphorus on the particles as a solid, i. e., under such conditions that the phosphorus does not freeze on the particles. Optimum conditions are established when the total heat in the powdered particles and vapor is just insufficient to permit phosphorus to remain in the vapor state so that at least some of it condenses as a liquid on the particles. In other words, the heat in the phosphorus powder and the metal particles should be such that the resulting mixture has a temperature just below the dew point of the phosphorus. However, good results are obtained at higher temperatures at which no condensation of phosphorus can occur on the metal particles provided that the temperature does not rise to the point where exothermic combination has been completed.

A simple practice of the invention with phosphorus vapor may be carried out as follows.

An alundum boat or the like containing a relatively thin layer of clean metal powder (for example, nickel powder with substantially unoxidized surfaces and of particle size ranging from 100 to 200 mesh) is placed in a muffle provided with means for passing phosphorus vapor thereinto in a non-oxidizing atmosphere. By cooling, the phosphorus may be caused to condense as a liquid on the powder metal mass. If the surface of the metal powder particles is oxidized, it is desirable to remove this through preliminary contact of the heated powders with a reducing gas, for example, dry hydrogen. Thus, the powder may be heated in the muffle to a temperature of about 300° C. while dry hydrogen is passed therethrough so as to remove any coating of oxide or the like from the metal and any oxygen that is entrained in the metal powder mass. After non-oxidizing conditions are established, phosphorus vapor from any convenient source is admitted into the muffle and passed over the heated metal powder until the requisite amount of phosphorus has been adsorbed in the mass. Thus, phosphorus vapor at 280° C. passed over a layer of nickel powder about ¼ inch thick and maintained at a temperature of about 270° C. results in the formation of a suitable metallurgical addition agent containing about 10% by weight of phosphorus after about 30 minutes.

Ordinarily, conditions of operation should be such that substantially all of the phosphorus is condensed as a liquid on the metal powder. If, however, residual phosphorus is contained in the exit gases from the muffle, this may be condensed separately and returned to the source of phosphorus vapor or circulated in vaporized condition back through the muffle.

In a more elaborate modification of the practice of my invention with phosphorus vapor, the latter is passed in countercurrent contact with metal powder in a first zone in which the temperature is too high to permit substantial condensation of phosphorus vapor and in a second zone in which the temperature is low enough to permit the phosphorus to condense to liquid. In this way, substantially all of the phosphorus is caught in the second zone, but the product withdrawn from the first zone has been heated so high that any unstable elemental phosphorus contained on the particles is vaporized. In such practice, the temperature of the first zone could be substantially below that at which exothermic combination between the metal powder and the phosphorus occurs.

The foregoing modification is adapted to a continuous operation in which the metal powder to be treated with phosphorus is first subjected to treatment in a cleansing chamber to remove moisture and entrapped gases of an oxidizing nature, and (when necessary) to remove solid oxidation products from the surface of the powder particles. Cleansing in the chamber is accomplished by treating the metal powders therein with a hot, non-oxidizing and preferably reducing gas. Thus, the metal powder may fall through the cleansing chamber in a dispersed condition in countercurrent contact with a rising current of flue gas containing sufficient carbon monoxide to convert any oxygen entrained in the powder to carbon dioxide, and the gas should be hot enough to permit such a reaction to occur. If reduction of solid oxygen products of oxidation on the surface of the particles is necessary in order to expose clean metal for subsequent contact with phosphorus, hot gas containing substantial quantities of hydrogen may be employed.

The cleansed metal powder from the cleansing chamber (while protected against exposure to the air) is conducted into a phosphorus treatment chamber where it passes in countercurrent contact with phosphorus vapor. Thus, the metal powder in a dispersed condition may fall through a rising stream of the phosphorus vapor in the chamber, the top of the chamber being maintained at a temperature low enough to assure the condensation of substantially all of the phosphorus as a liquid, and the bottom of the chamber being maintained at a temperature high enough to volatilize any unstabilized phosphorus on the metal particles entering this zone, the treated metal powder particles being withdrawn from the bottom of the chamber, cooled under non-oxidizing conditions to room temperature, and thereafter to a mild crushing action, if necessary, to separate any metal particles that may have become cemented together during the treatment with phosphorus.

With a view toward controlling the rate at which phosphorus is adsorbed by the metal powder particles, phosphorus vapor in contact with the metal powder may be diluted with a non-oxidizing or reducing gas, for example, dry nitrogen. This lowers the concentration and vapor pressure of the phosphorus and reduces the rate at which it is adsorbed. Dilution, however, requires complexities of apparatus and procedure which usually are not justifiable from an economic standpoint, and ordinarily it is advisable to employ substantially undiluted phosphorus vapor.

Penetration of phosphorus into the metal particles is more profound and the phosphorus content of the particles more uniform as the time of heat treatment is increased.

As indicated hereinbefore, the product of my invention is suited for use as a metallurgical addition agent whenever it is desired to add to a metallic body both phosphorus and the metal with which it is included in the product and with which it tends to combine exothermically at elevated temperatures. Thus, the product of my invention containing copper and phosphorus may be added to metal which is to be made into phosphor-bronze by a process involving fusion. Upon heating the product in contact with the metal to an elevated temperature, exothermic heat of combination is released and is employed usefully to aid in melting. The thermal economies thus brought about are considerable.

In welding processes, and especially in welding processes in which the article to be welded is passed through a heating zone maintained at a temperature high enough to insure the heating of the article to the welding point while passing through the zone, my invention affords great heat savings and moreover, permits welding to be accomplished in a zone maintained at substantially lower temperatures than employed heretofore, despite the fact that the surface of the member to be welded is heated as high or higher than in heretofore customary operations. In other words, when employing the welding composition of my invention, ordinarily it is only necessary to raise the points to be welded to the temperature at which exothermic combination of the elements in the welding composition begins, the heat of combination being sufficient to bring about fusion of the welding composition and to raise the metal surfaces to be joined to welding heat. This may be illustrated by contrasting the butt-welding operation of copper members described hereinbefore with the operation in which the welding composition of my invention containing 7.3% phosphorus and the balance copper is employed instead of a true phosphor-copper alloy of eutectic composition. In accordance with my invention, copper powder made as described hereinbefore and containing 7.3% phosphorus is placed in the joint to be welded with a suitable flux, for example, borax or sodium silicate, and the joint is passed slowly through the heating zone maintained at a temperature which may be as low as 650° C. As the temperature of the joint is raised, there is an evolution of heat which "boosts" the temperature further whereupon adequate welding is accomplished even though the heating zone never attains the melting point of alloy formed at the joint. Thus, heretofore customary operations employing phosphor-copper alloy containing the same proportions of phosphorus, require that the heating zone be maintained at temperatures in the neighborhood of 850–900° C. In contrast, adequate welding is obtained, in accordance with my invention, when the zone is heated to a point substantially below the melting point of the lowest melting phosphor copper alloy, i. e., the eutectic.

For welding stainless steel, I have found that a suitable welding composition is made from a mixture of metal powder containing copper, nickel and tin in the proportions of about 50:35:10 by weight. Into a dry uncompressed mass of this powder mixture there is intimately incorporated 5% by weight of powdered red phosphorus. Then the mixture is heated under non-oxidizing conditions to a temperature of about 270° C., maintained at this temperature for about 30 minutes, and then cooled immediately under non-oxidizing conditions. Mild comminution restores the mixture to powder state and the product is then ready for use in welding stainless steel. A convenient practice in welding stainless sheets and the like of the familiar "18 and 8" variety, is to press a layer of the welding composition between the members which form the joint by clamping the members together. (A flux, such as borax or sodium silicate, may be mixed with the composition if desired but is not necessary when the joint is compressed in this manner.) The joint then is heated to a temperature of at least 600° C. whereupon adequate welding ensues. Compression aids in accomplishing welding at this low temperature and also makes it unnecessary to employ fluxes or a special non-oxidizing atmosphere, because the welding composition is protected from oxidation within the joint. The weld formed in the above-described procedure is practically as corrosion-resistant as the original stainless steel, probably because of the corrosion-inhibiting properties of the nickel incorporated into the weld.

My invention is by no means restricted to the foregoing examples because welding compositions capable of releasing heat may be formed with phosphorus and a variety of metals. The critical temperature below which the welding composition of my invention should be formed and above which it tends to release its exothermic heat depends upon the particular metal employed. The critical temperature may be determined in any instance by slowly heating a mixture of red phosphorus with the powder of the particular metal being investigated in a non-oxidizing or reducing atmosphere while conducting pyrometric observations of the mixture. A thermocouple may be embedded in the mixture or the observation may be made by means of an optical pyrometer. In either case, it will be found that there is a sudden evolution of heat when a mixture is raised beyond a certain temperature. The critical temperature for various metals has been determined experimentally and is reported below:

| Mixture | | Critical temperature range, °C. | |
|---|---|---|---|
| Metallic ingredients, percent by weight | Percent by weight, phosphorus | Heat evolution begins | Heat evolution ends |
| Cu—92 | 8 | ±135 | +370 |
| Ni—89 | 11 | ±425 | +810 |
| Pb—95 | 5 | ±425 | +555 |
| Cu—50; Ni—35; Sn—5 | 5 | ±385 | +790 |
| Co—88.5 | 11.5 | ±380 | +910 |

Further data on these determinations are given on the accompanying drawings.

It is difficult to determine in all instances whether the exothermic heat of combinations generated by the phosphorus and the metal or metals is one of solution or reaction. This, however, is immaterial from a practical standpoint since the object is to utilize the heat irrespective of the particular physico-chemical action by which it is derived.

The amount of phosphorus to employ will depend chiefly upon the amount of phosphorus which it is desired to incorporate in the welding or other metallurgical operation for which the metallurgical addition agent of my invention is designed. Generally speaking, the phosphorus content of the addition agent may correspond with the phosphorus content of the metallic phosphides and alloys heretofore customarily employed. In the case of an agent made from phosphorus and copper and employed as a welding composition, the phosphorus content should range from 5 to 10% by weight, a phosphorus content corresponding to eutectic composition, i. e., 7.3% by weight being preferred. However, a much higher phosphorus content may be incorporated in the copper and still form a stable composition. I have incorporated successfully as much as 40% by weight of phosphorus in the copper according to the process of my invention and have achieved a composition which is to all intents and purposes stable in atmospheric conditions. When the metallurgical addition agent of my invention is employed as a substitute for a mass alloy for incorporating phosphorus into phosphor-bronze and the like, it may be desirable to employ a relatively large proportion of phosphorus in the mixture, say upwards of 15%.

The metallurgical addition agent of my invention should be employed in substantially the condition in which it was formed. In other words, it should not be consolidated under high pressure or at elevated temperatures because of the danger of releasing and losing the exothermic heat. However, if a massive form of an addition agent is desired, for example, a welding rod, the loose powder particles of the addition agent may be bonded together with an extraneous substance which does not interfere in the operation for which the mass is intended. In the case of welding rods and the like, the bonding agent employed may be a flux having bonding properties, for example, borax or sodium silicate. Similarly, in the manufacture of phosphor-bronze, the addition agent of my invention may, prior to use, be briquetted under mild pressure and temperature with a suitable fluxing agent or even with a carbonaceous binder such as tar or molasses which will burn or volatilize at the temperature of manufacure.

Generally speaking, any of the fluxes which have been employed heretofore in melting or welding operations for a particular metal or metal mixture may be employed in the practice of my invention. The use of fluxes having a strong oxidizing action should be avoided for the reason that these tend to affect the phosphorus.

The addition agent of my invention may be used as a welding composition in any of the heretofore customary types of welding. In the acetylene or arc welding processes, the powder may be bonded together and employed in a form of a rod or an electrode if desired, but ordinarily will find application as unbonded powder. In pressure welding, as described hereinbefore with reference to stainless steel, bonding results from merely compressing a layer of the powder between the surfaces to be welded and heating the joint to the powder at which exothermic combination and consequent fusion occurs. In some instances, for example, with a composition made from nickel and phosphorus, mere pressure will generate sufficient heat to bring about the exothermic combination and resulting welding.

I claim:

1. A method of making a composition of phosphorus and metal, said composition being substantially stable under atmospheric conditions but capable of generating exothermic heat at elevated temperatures, which comprises heating in the presence of phosphorus a finely divided substantially uncompressed mass of a metal having a tendency for combining exothermically with phosphorus, the heating being conducted at a temperature above the melting point of yellow phosphorus but below that at which the phosphorus combines completely with the metal, whereby uncombined phosphorus penetrates the metal powder particles and becomes substantially stable under atmospheric conditions.

2. A method of making a composition containing phosphorus and a metal, said composition being substantially stable under atmospheric conditions but capable of generating exothermic heat at elevated temperatures, which comprises adsorbing elemental phosphorus upon substantially uncompacted powder particles of a metal which tends to combine exothermically with phosphorus while maintaining the metal at a temperature in excess of the melting point of yellow phosphorus but substantially below that at which the phosphorus combines with the metal.

3. A method of making a mixture of phosphorus and metal, said mixture being substantially stable under atmospheric conditions but capable of generating exothermic heat at elevated temperatures, which comprises treating with molten phosphorus in the absence of substantial pressure a substantially uncompacted mass of powder of a metal, said metal being one that tends to react exothermically with phosphorus at temperatures in excess of the boiling point of yellow phosphorus, whereby free phosphorus becomes adsorbed by the particles of metal powder and is thereby rendered stable.

4. A method of making a composition containing phosphorus and metallic copper and substantially stable under atmospheric conditions but capable of generating exothermic heat at elevated temperatures which comprises treating with phosphorus a substantially uncompacted mass of metal powders containing substantial proportions of copper at a temperature above the melting point of yellow phosphorus but below about 135° C., whereby a coating containing uncombined phosphorus is formed on the metal powder particles.

5. A method of making a composition containing phosphorus and copper and substantially stable under atmospheric conditions but capable of generating exothermic heat at elevated temperatures which comprises maintaining a substantially uncompacted mass of copper powder at a temperature ranging between the melting point and the boiling point of yellow phosphorus while bringing phosphorus into contact with said mass, whereby the phosphorus becomes adsorbed by the copper powder particles and is rendered stable under atmospheric conditions.

6. A method of making a mixture containing phosphorus and metal that is substantially stable under atmospheric conditions but capable of generating exothermic heat at elevated temperatures which comprises passing phosphorus vapor into contact with a substantially unconsolidated mass of powder particles of a metal which tends to react exothermically with phosphorus at an elevated temperature while maintaining said mass at a temperature above the melting point of yellow phosphorus and below said elevated temperature until the phosphorus has penetrated the powder particles, and then cooling the mass.

7. Process according to claim 6 in which the mass of metal powder and the phosphorus are brought into countercurrent contact with each other.

8. Process according to claim 6 in which the mass of metal powder is brought into countercurrent contact with the vapor phosphorus in a first zone in which the temperature is too high to permit condensation of the phosphorus and in a second zone in which the temperature is low enough to permit the phosphorus to condense.

9. Process according to claim 6 in which the phosphorus vapor is diluted with an inert gas.

10. A method of making a composition of phosphorus with a metal selected from the group consisting of platinum, zinc, nickel, cobalt, silver, gold, copper, lead, cadmium and tungsten, said composition being substantially stable at atmospheric conditions but capable of generating exothermic heat at elevated temperatures which comprises treating a substantially uncompacted metallic powder mass containing one or more metals selected from the group with phosphorus at a temperature in excess of the melting point of yellow phosphorus but substantially below that at which the phosphorus combines completely with the uncompacted metals of the mass until the phosphorus has penetrated the metal powder particles.

11. Process according to claim 10 in which the resulting mass is cooled after treatment with the phosphorus and subjected to mild crushing in order to restore it to the powder state.

12. Process according to claim 10 in which entrained oxidizing gases are removed from the metallic mass prior to treating said mass with phosphorus.

13. Process according to claim 10 in which the metallic powder mass is mixed with pulverized red phosphorus at temperatures below the melting point thereof and subsequently heated above the melting point of phosphorus.

14. A process for making a composition of phosphorus and metal that is substantially stable under atmospheric conditions but capable of generating exothermic heat at elevated temperatures, which comprises bringing elemental phosphorus into contact with substantially uncompressed powder of a metal that tends to react exothermically with phosphorus at elevated temperatures while maintaining the metal powder in a non-oxidizing atmosphere at temperatures in excess of about 44° C. but below the temperature at which the exothermic combination of phosphorus and the uncompressed metal powder proceeds substantially.

15. Process according to claim 14 in which the metal is copper and the temperature during heating is maintained between the melting point and 370° C.

16. Process according to claim 14 in which the metal is copper and is maintained at a temperature ranging from above the melting point of phosphorus to about 135° C.

17. A method of making a composition of phosphorus and metal, said composition being substantially stable under atmospheric conditions but capable of generating exothermic heat at elevated temperatures which comprises bringing elemental phosphorus in contact with a substantially uncompacted powder metal mass containing copper, nickel and tin in the ratio of about 50:35:10 by weight at a temperature ranging from 44° C. to 385° C., whereby free phosphorus penetrates the metal powder and becomes substantially stable at atmospheric temperatures.

18. A method of making a composition of phosphorus and metal which comprises heating in the presence of phosphorus a finely divided substantially uncompacted powder having a tendency to combine exothermically with phosphorus, the heating being conducted in a non-oxidizing atmosphere at a temperature above the melting point of yellow phosphorus, and maintaining the temperature and period of treatment so that phosphorus penetrates the metal powder particles and becomes substantially stable under atmospheric conditions but does not completely combine with the metal.

CHARLES HARDY.